United States Patent [19]

Weber et al.

[11] Patent Number: 5,454,613

[45] Date of Patent: Oct. 3, 1995

[54] AUTOMATIC LOCKING DEVICE FOR AN AUXILIARY SEAT

[75] Inventors: Peter Weber, Göteborg; Björn Hedenberg, Hällingsjö, both of Sweden

[73] Assignee: AB Volvo, Sweden

[21] Appl. No.: 128,867

[22] Filed: Sep. 29, 1993

[51] Int. Cl.⁶ ............................................. B60N 1/10
[52] U.S. Cl. .............. 296/65.1; 248/503.1; 297/378.12; 70/261
[58] Field of Search .................. 296/63, 64, 65.1, 296/66, 68.1; 248/503.1; 297/250.1, 254, 255, 378.1, 378.12, 378.13; 70/261

[56] References Cited

U.S. PATENT DOCUMENTS

| | | | |
|---|---|---|---|
| 3,207,549 | 9/1965 | Posh | 296/65.1 |
| 3,246,924 | 4/1966 | Krueger et al. | |
| 3,522,970 | 8/1970 | Francis | 296/65.1 X |
| 4,519,646 | 5/1985 | Leitermann et al. | 296/65.1 X |
| 4,637,648 | 1/1987 | Okino et al. | 296/63 |
| 4,657,297 | 4/1987 | Ishibashi | 296/63 |
| 4,667,492 | 5/1987 | Tomatsu et al. | 70/261 |
| 4,756,569 | 7/1988 | Trutter et al. | 296/63 |
| 4,880,264 | 11/1989 | Yamazaki et al. | 296/65.1 |

FOREIGN PATENT DOCUMENTS

| | | | |
|---|---|---|---|
| 2630333 | 1/1978 | Germany | 248/503.1 |
| 3729642 | 3/1989 | Germany | 296/64 |
| 3911265 | 10/1990 | Germany . | |
| 7101941 | 4/1975 | Sweden . | |
| 2268877 | 1/1994 | United Kingdom . | |

*Primary Examiner*—Joseph D. Pape
*Attorney, Agent, or Firm*—Lerner, David, Littenberg, Krumholz & Mentlik

[57] ABSTRACT

An automatic locking device is disclosed which may be used to secure a rear-facing auxiliary seat in a raised position in a station wagon. The locking device includes an elongate engagement member which is arranged to be rotatable about its longitudinal axis between a normal position and a release position. The engagement member is provided with notches which are adapted to cooperate with teeth on a pair of jaws in a receiving arrangement. The notches and the teeth are so shaped that when the engagement member is in its normal position, the engagement member can be inserted into the receiving element and withdrawal is prevented by interaction between the notches and the teeth. When it is desired to remove the engagement member from the receiving arrangement, the engagement member is rotated to its release position in which smooth surfaces on the engagement member displace the jaws of the receiving element apart so as to disengage the teeth from the notches, thereby allowing the engagement member to be withdrawn.

15 Claims, 10 Drawing Sheets ic device embodying the principles of the present invention;

AUTOMATIC LOCKING DEVICE FOR AN AUXILIARY SEAT

TECHNICAL FIELD

The present invention relates to an automatic locking device suitable for a backrest of an auxiliary rear-facing seat of the type which is fitted in a cargo area behind a conventional rear seat of a station wagon.

BACKGROUND OF THE INVENTION

Auxiliary seats of the above-mentioned type may be provided in station wagons for use when the conventional seats of the vehicle are occupied and it is desirous to transport additional children or small adults. For reasons of safety, it is particularly important that the backrest of the auxiliary seat be securely locked in place during deployment of the seat. In accordance with U.S. safety regulations, locking must take place automatically when the seat is raised. When the auxiliary seat is to be stowed after use, it is preferable if the locking device can be released one-handedly.

Auxiliary seats are known which are stowed beneath the cargo bay floor and which, when erected, are self-supported by a series of levers. Such seats are locked in position by means of a locking pin immobilizing one of the otherwise pivotal joints between the levers. A problem with such a type of auxiliary seat is that the series of levers must be able to accommodate not only the weight of the occupant(s) of the seat, but also forces which arise during a collision. In addition, the series of levers can obstruct the free running of seat belts.

The present invention is directed towards a locking device which can suitably, though not exclusively, be used in conjunction with the backrest of an auxiliary seat, which backrest, in a raised position, abuts a conventional rear seat backrest. With such an auxiliary seat, because the conventional rear seat backrest supports the auxiliary seat backrest, the locking device need only be capable of withstanding forces which arise during a rear end collision.

SUMMARY OF THE INVENTION

It is therefore an object of the present invention to provide an automatic locking device which is suitable for the backrest of an auxiliary seat and which fulfils the above-mentioned safety and convenience demands.

This object is achieved in accordance with the invention by means of an automatic locking device for a backrest of a rear-facing auxiliary seat, which backrest is pivotally displaceable between a stowed position in which the backrest is substantially coplanar with a cargo bay floor in a vehicle and a raised position in which an upper region of said backrest abuts a conventional rear seat backrest in said vehicle, said locking device comprising a main housing arranged in the backrest of said auxiliary seat;

an engagement member affixed to a spindle so as to be pivotally mounted in said main housing for displacement between a retracted position in which said member is substantially accommodated within said main housing and an extended position in which engagement member projects from said main housing in a direction towards said conventional rear seat backrest; and actuation means for effecting said displacement of said engagement member between said retracted position and said extended position;

wherein said actuation means effects said displacement of said engagement member responsive to the angular position of the backrest of the auxiliary seat with respect to the cargo bay floor.

The invention also provides for a locking device comprising an engagement member journalled to a first component for rotation about an axis, and a receiving arrangement carried on a second component, said engagement member comprising an elongate rod extending along said axis and having opposed notched surfaces, said surfaces being provided with at least one notch, and smooth side portions between said opposed notched surfaces;

and said receiving arrangement comprising a pair of spaced apart, resilient jaws for engagement with said notches on said engagement member when said engagement member is in a normal position; wherein when said engagement member is rotated from said normal position to a release position, said smooth side portions of said engagement member displace the jaws of the receiving element away from each other to thereby disengage said jaws from the notches on the opposed notched surfaces of said engagement member.

The invention further provides for a locking device for a first component, which component is pivotally displaceable with respect to a fixed member between a first position and a second position, said locking device comprising a main housing arranged on said first component;

an engagement member affixed to a spindle so as to be pivotally mounted in said main housing for displacement between a retracted position in which said member is substantially accommodated within said main housing and an extended position in which engagement member projects from said main housing towards a second component; and actuation means for effecting said displacement of said engagement member between said retracted position and said extended position;

wherein said actuation means effects said displacement of said engagement member responsive to the angular position of the first component with respect to the fixed member.

Further scope of applicability of the present invention will become apparent from the detailed description given hereinafter. However, it should be understood that the detailed descriptions and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter by way of example only and with reference to the attached drawings in which.

DETAILED DESCRIPTION OF PREFERRED EMBODIMENTS

The locking device of the present invention will be hereinafter described in conjunction with an auxiliary seat. It is to be understood, however, that its application in auxiliary seats is only one of many possible applications which will be apparent to the skilled person.

Figure 1:
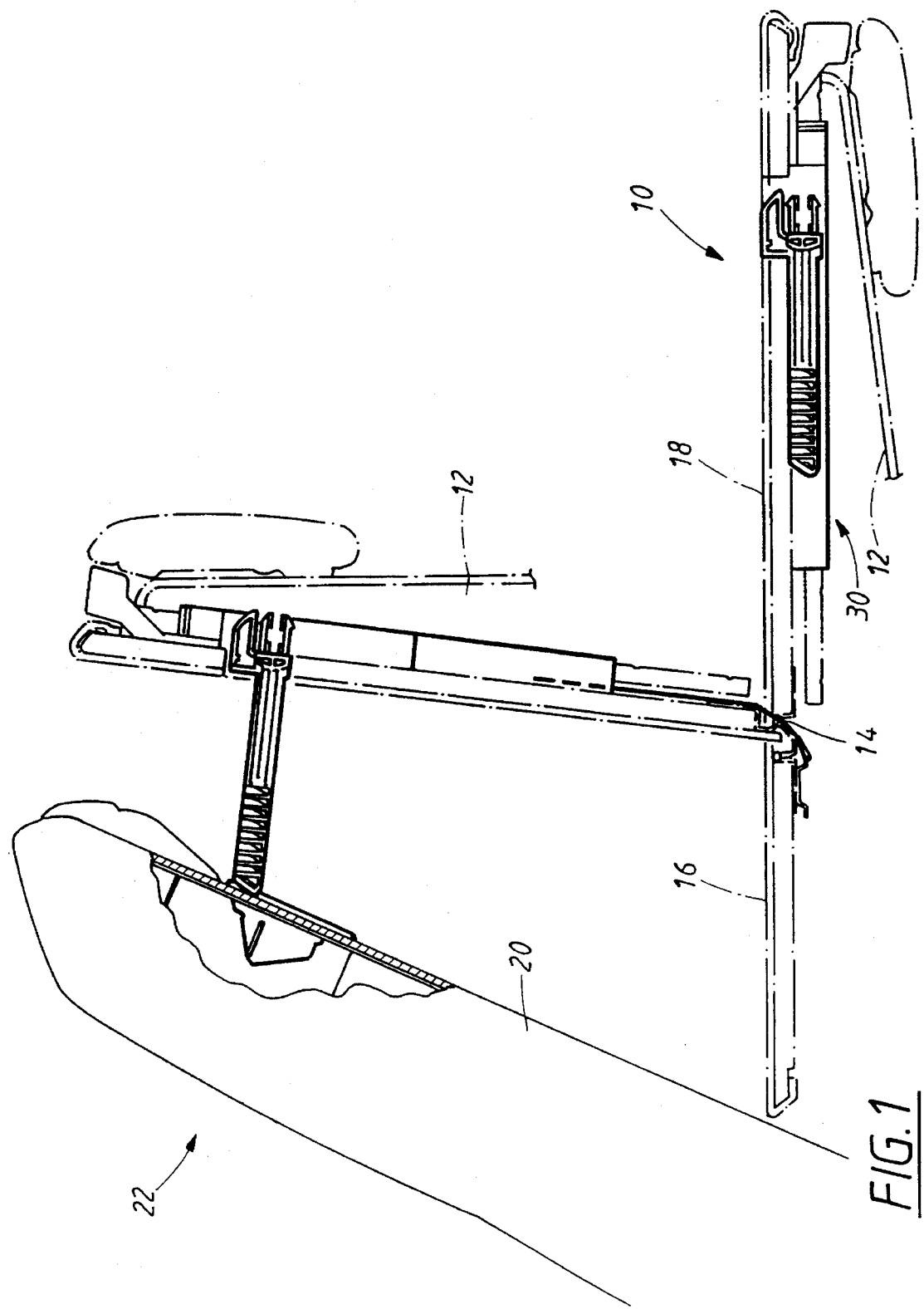
FIG. 1 is a schematic partial sectional view of a rear seat arrangement in a station wagon with a backrest of a conventional rear seat in a raised locked position and an auxiliary seat shown in both a stowed position and a partially raised position, the seating arrangement employing a locking device according to the present invention.

In the drawings, reference numeral 10 generally denotes an auxiliary seat incorporating a backrest 12 pivotally affixed at a pivot point 14 to a cargo bay floor 16 of a vehicle of the station wagon type. In FIG. 1, the auxiliary seat 10 is shown in both its stowed position in which an upper facing surface 18 of the backrest 12 is substantially coplanar with the cargo bay floor 16 behind a backrest 20 of a conventional rear seat 22, and a partially raised position.

As generally denoted by reference numeral 30, the backrest 12 of the auxiliary seat accommodates a locking device according to the invention. As shown in FIG. 1, in the stowed position of the auxiliary seat, no part of the locking device 30 projects above the upper facing surface 18 of the backrest 12.

Figure 2:
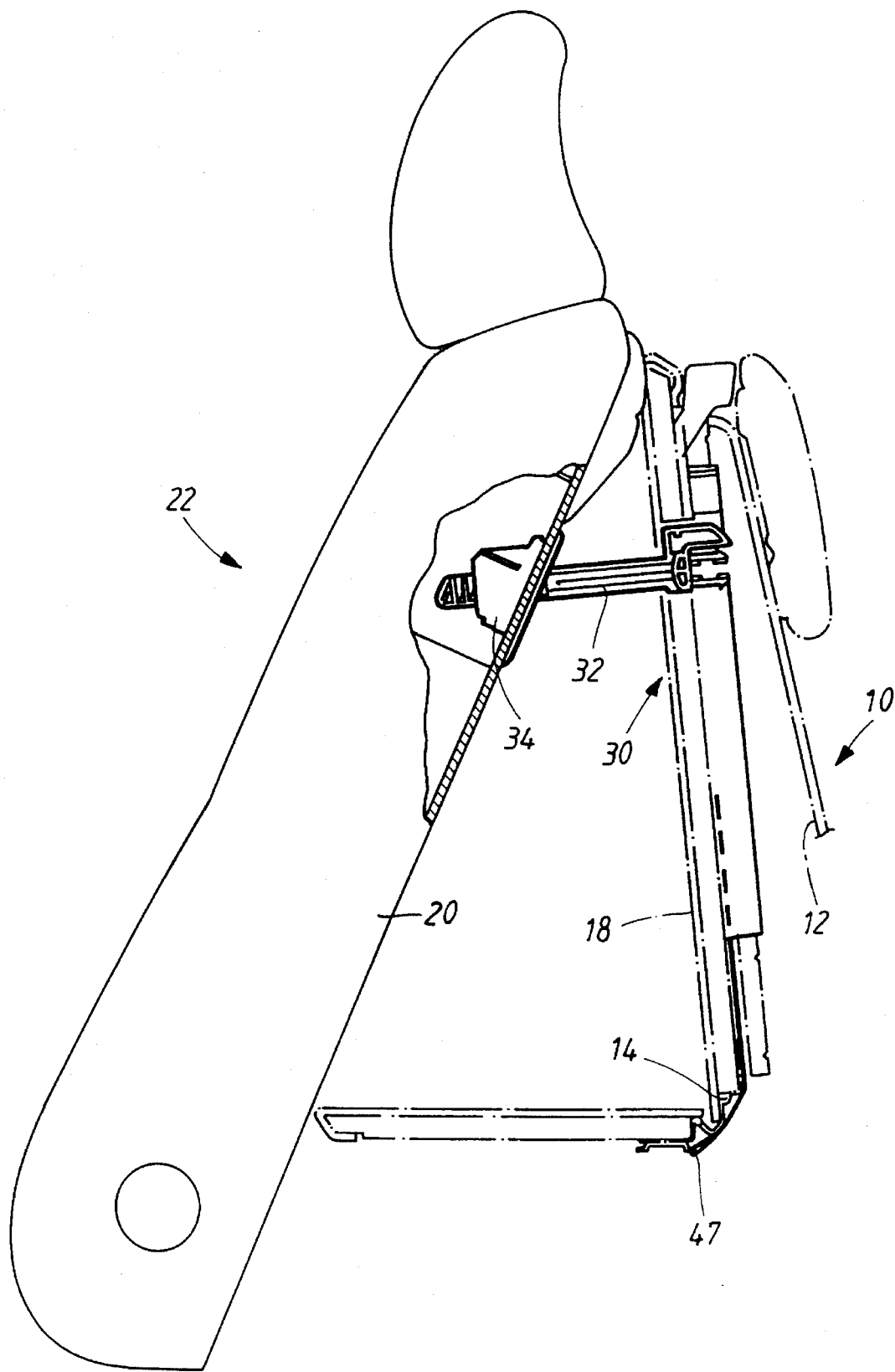
FIG. 2 is a view corresponding to FIG. 1, though with the auxiliary seat in a fully raised position.

In FIG. 2, the backrest 12 of the auxiliary seat 10 is shown in its raised position in which an upper region of the backrest 12 abuts the backrest 20 of the conventional rear seat 22. In this raised position, an engagement member 32 forming a part of the locking device 30 projects from the auxiliary seat backrest 12 and passes into a receiving arrangement 34 affixed within the backrest 20 of the conventional rear seat 22. As will be described in greater detail hereinafter, the displacement of the engagement member 32 with respect to the backrest 12 of the auxiliary seat is dependent on the angular position of the backrest 12 with respect to the cargo bay floor 16.

Figure 3:
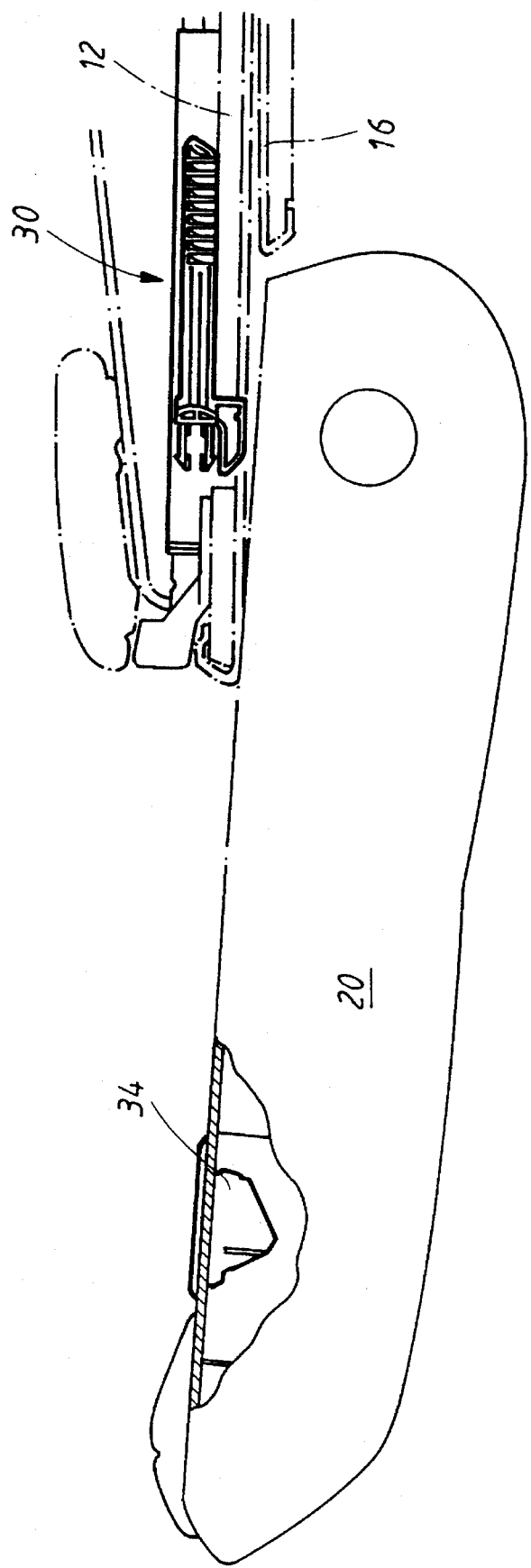
FIG. 3 is a view corresponding to FIGS. 1 and 2, though with the conventional rear seat backrest and the auxiliary seat in a forward-folded position.

As is normally the case with conventional station wagons, the conventional rear seat backrest 20 can be folded forwards to increase the load-carrying capacity of the cargo bay. For reasons of safety, it is inadvisable that an auxiliary seat be used when the conventional rear seat is folded forwards. In accordance with a further embodiment of the present invention, should the backrest 12 of the auxiliary seat 10 be inadvertently raised when the conventional rear seat is folded forwards, means are provided to prevent the locking device from being damaged. This is illustrated in FIG. 3. In FIG. 3, the backrest 20 of the conventional rear seat 22 is folded forwards so as to be substantially coplanar with the cargo bay floor 16. To prevent the engagement member 32 of the locking device 30 from contacting the conventional rear seat backrest 20 with possibly damaging consequences, means are provided to retract the engagement member 32 once the auxiliary seat backrest 12 has passed its normal raised position (see FIG. 2).

How the engagement member 32 of the locking device according to the invention is caused to be displaced between the extended position and the retracted positions as illustrated in FIGS. 1 to 3 will now be described with particular reference to FIGS. 4 to 7.

Figure 4:
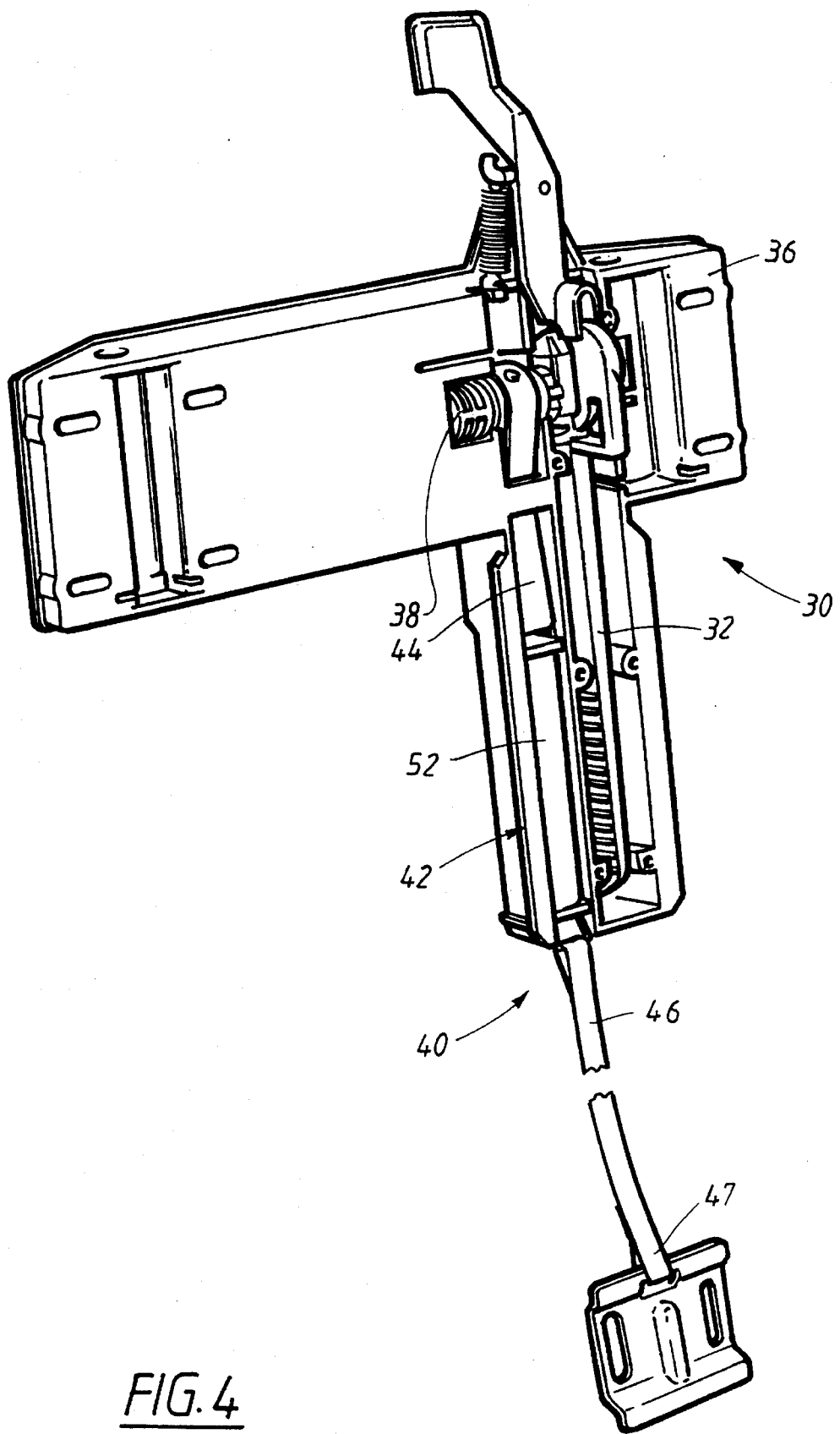
FIG. 4 is a schematic perspective view of the locking device in a non-actuated position corresponding to the stowed position of the auxiliary seat in FIG. 1.

In FIG. 4, the locking device 30 of the present invention is shown in a condition which corresponds to the auxiliary seat 10 being in its stowed position (see FIG. 1). In this condition, the engagement member 32 is in a retracted position within a main housing 36. The engagement member 32 is affixed to a spindle 38 which is pivotally mounted in the main housing 36. The engagement member, spindle and main housing are suitably made from a plastics material. For example, the engagement member may be made from PA6 (polyamide)+45% glass fibre, whilst the spindle and main housing may be made from POM (Polyoxymethylene). In order to effect displacement of the spindle 38 and thereby also that of the engagement member 32, actuation means generally denoted by reference numeral 40 are provided. The actuation means 40 comprise a spring arrangement, generally denoted by 42, cooperating with the spindle 38 via a flexible operating strap 44. The spring arrangement is influenced by a command member 46, preferably in the form of a flexible strap. As best shown in FIG. 2, one end 47 of said command member 46 is rigidly affixed to the cargo bay floor 16.

Figure 7:
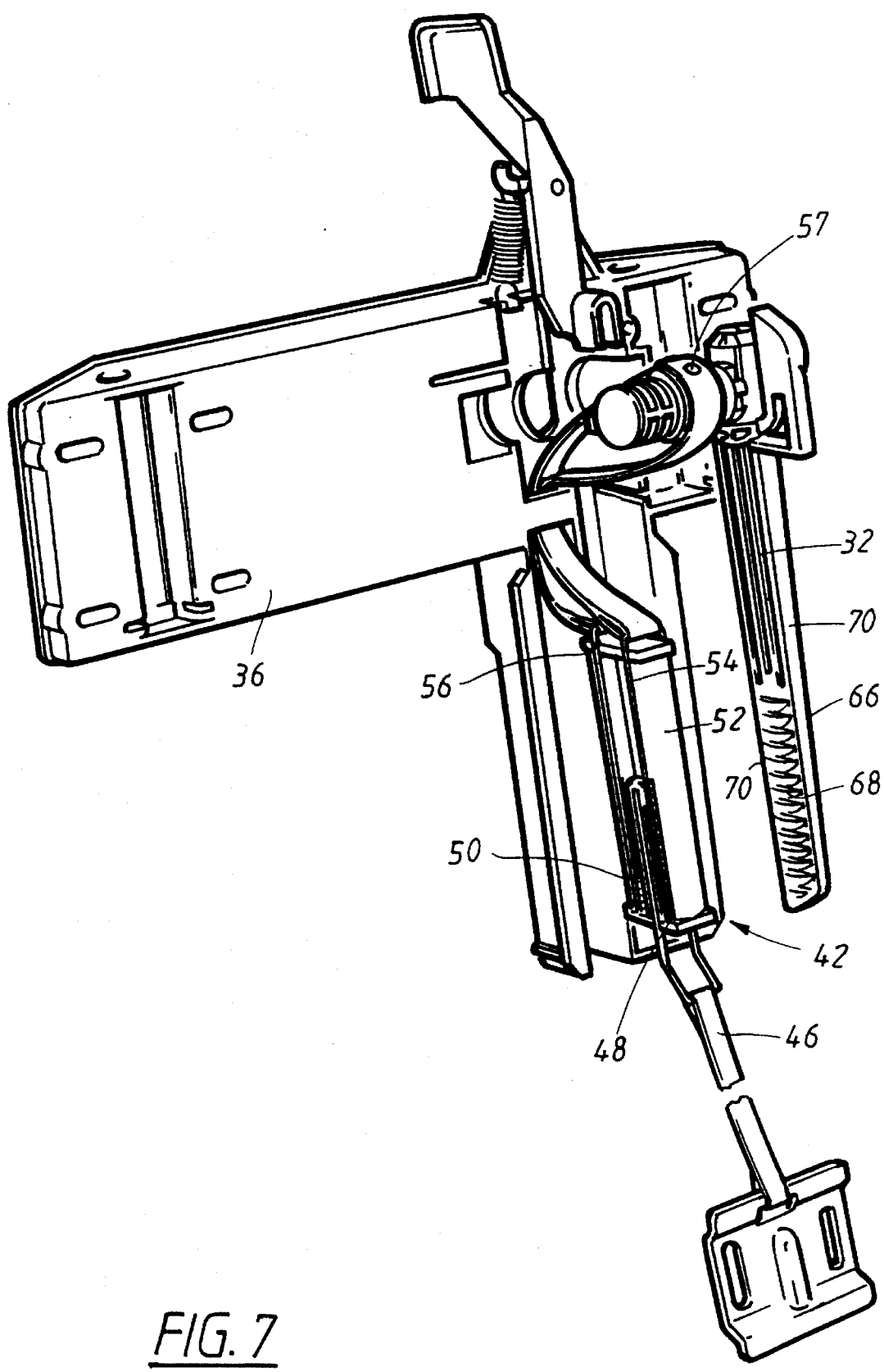
FIG. 7 is a schematic perspective view of some of the components making up a locking device according to the invention.

With particular reference to FIG. 7, the spring arrangement 42 comprises a relatively weak compression spring 48 and a relatively strong compression spring 50 arranged side by side in a spring housing 52. The command member 46 is connected to the spring housing 52 to effect sliding displacement of the spring housing within the main housing 36 responsive to the angular position of the backrest 12 of the auxiliary seat with respect to the cargo bay floor 16. The flexible operating strap 44 presents a first free end which is attached to a first buckle arrangement 54. The first buckle arrangement 54 is in turn connected to the relatively weak spring 48 within the spring housing 42. The flexible operating strap 44 similarly presents a second free end which is attached to a second buckle arrangement 56. The second buckle arrangement 56 is in turn connected to the relatively strong spring 50 within the spring housing 42. The operating strap 44 passes around the spindle 38 of the engagement member 32 and is secured to the spindle using any suitable means, such as a stud 57 or similar, at a mid portion of the belt between the first and second free ends.

Figure 5:
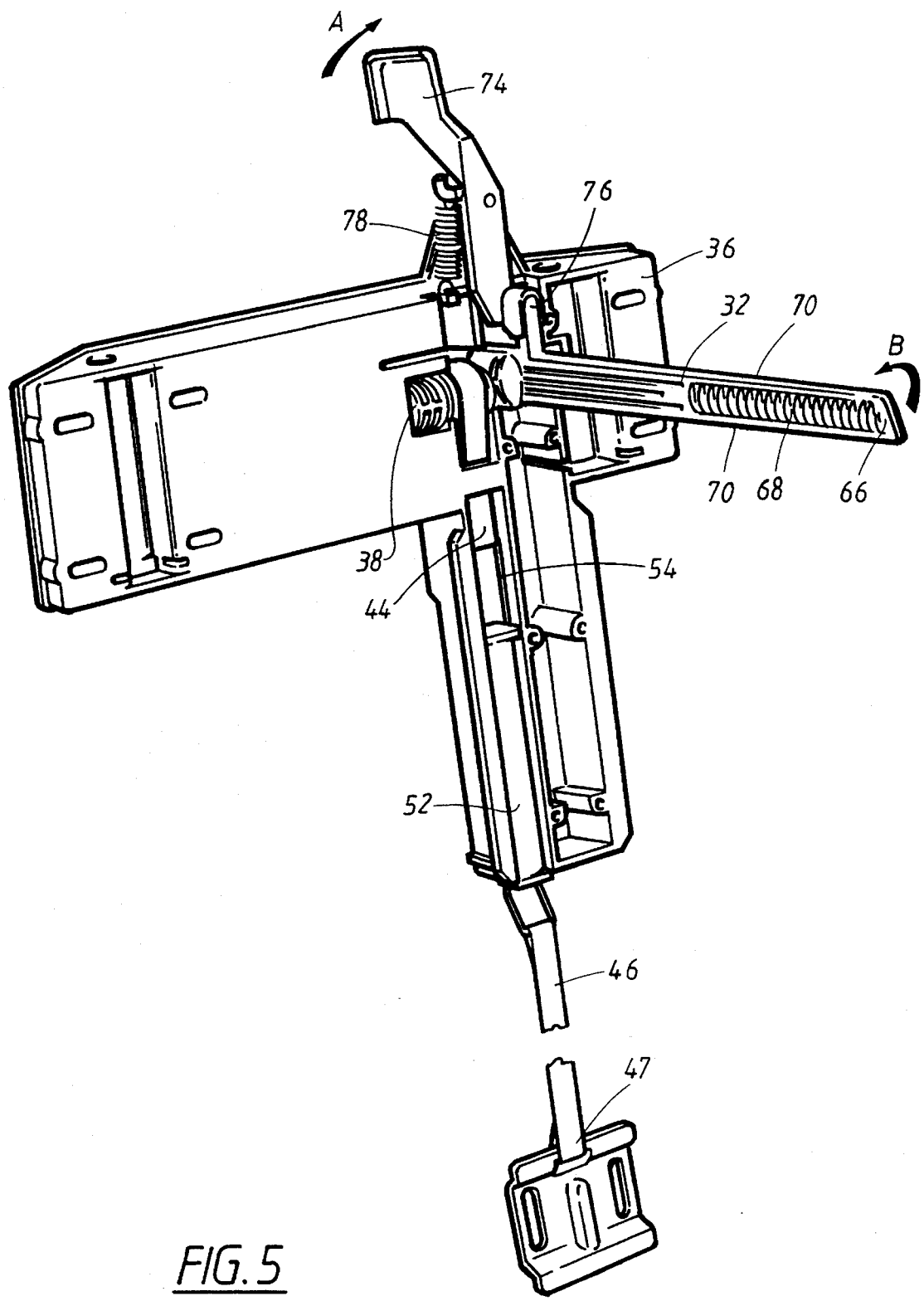
FIG. 5 is a schematic perspective view of the locking device in an actuated position corresponding to that of FIG. 2.
Figure 6:
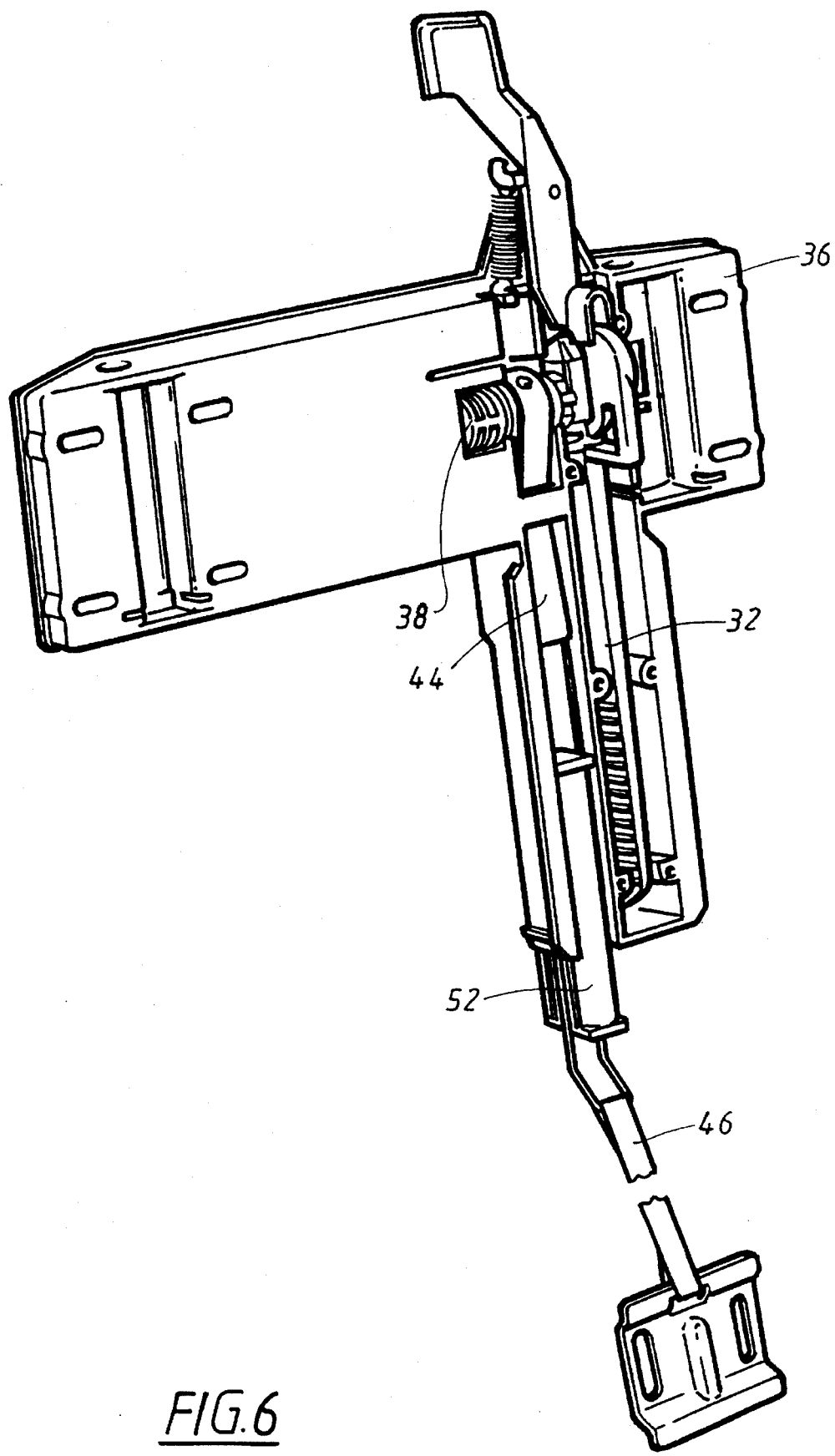
FIG. 6 is a schematic perspective view of the locking device in a retracted position corresponding to that of FIG. 3.

Thus, in the stowed position of the auxiliary seat shown in FIG. 1, the locking device 30 is in the condition shown in FIG. 4, i.e. the command strap 46 is substantially untensioned, thereby implying that the springs 48, 50 within the spring housing 52 are fully extended. When the backrest 12 of the auxiliary seat is pivoted about the pivot point 14 to occupy its raised position as shown in FIG. 2, the command strap is tensioned due to the increasing distance of the main housing 36 from the fixed end 47 of the command strap, thereby drawing the spring housing 52 downwards as shown in FIG. 5. Since the relatively weak spring 48 is more easily compressed than the relatively strong spring 50, the downwards displacement of the spring housing 52 causes the relatively weak spring 48 to be compressed by an amount corresponding to the displacement of the spring housing. Meanwhile, the relatively strong spring 50 remains substantially uncompressed and thus, via its buckle 56, draws the second free end of the operating strap 44 downwardly. Since the operating strap 44 is fastened to the spindle 38, the spindle 38 is caused to rotate, thereby effecting displacement of the engagement member 32 from its retracted position (FIGS. 1 and 4) to its extended position (FIGS. 2 and 5).

In accordance with a preferred embodiment of the invention, should the backrest 12 of the auxiliary seat 10 be inadvertently raised when the conventional rear seat is folded forwards, means are provided to retract the engagement member 32. Thus, and with reference to FIGS. 3, 6 and 7, as the auxiliary seat backrest 12 is being folded fully forwards, the command strap 46 is subjected to increasing tension. This increasing tension fully compresses the relatively weak spring 48 in the spring housing 52. As the tension increases further, the relatively strong spring 50 is subject to compression, thereby causing the second free end of the operating strap 44 to approach the spindle 38. This implies that the spindle is caused to rotate to thereby retract the engagement member 32 back into the main housing 36. Thus, when the backrest 12 of the auxiliary seat contacts the forward folded backrest 20 of the conventional rear seat, the engagement member 32 has already been retracted into the main housing and is accordingly not exposed to possibly damaging forces.

When the auxiliary seat backrest 12 is returned from the position shown in FIG. 3 to its stowed position as shown in FIG. 1, tension in the command strap 46 is reduced and the spring housing 52 is drawn back towards its initial position within the main housing 36 under the influence of the expanding compression springs 48 and 50. Due to an equilibrium effect of the springs, the operating strap 44 is uninfluenced by the return movement of the spring housing, and the engagement member 32 thus remains in its retracted position.

Figure 8:
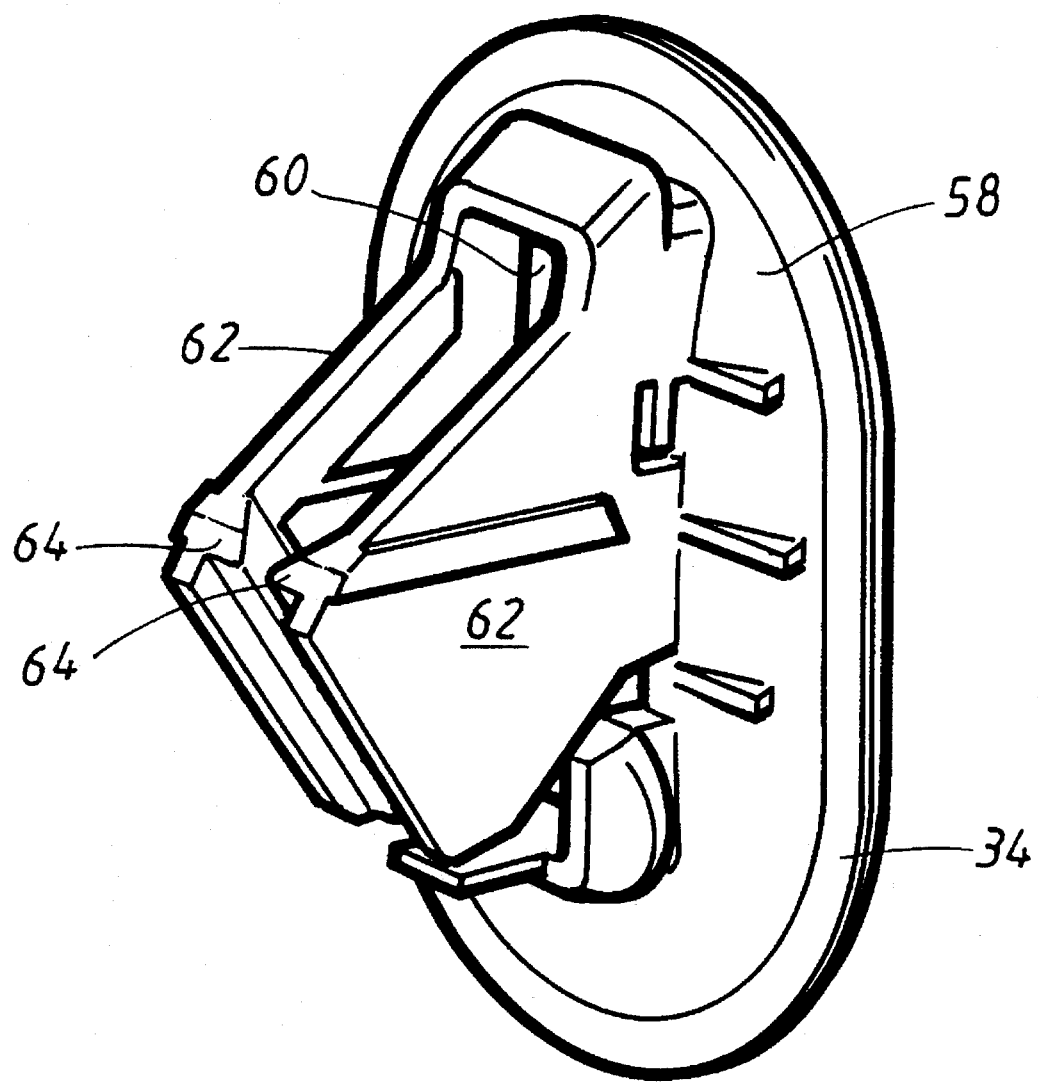
FIG. 8 is a schematic perspective view of a receiving arrangement for cooperation with the locking device according to the invention.

Cooperation between the engagement member 32 and the receiving arrangement 34 affixed within the backrest 20 of the conventional rear seat 22 will now be described with particular reference to FIGS. 8 and 9.

The receiving arrangement 34 is preferably made from POM and comprises a peripheral frame 58 delimiting an orifice 60 through which the engagement member 32 can pass. The frame 58 supports a pair of spaced apart, resilient jaws 62, with each jaw presenting an inwardly directed tooth 64.

Figure 9:
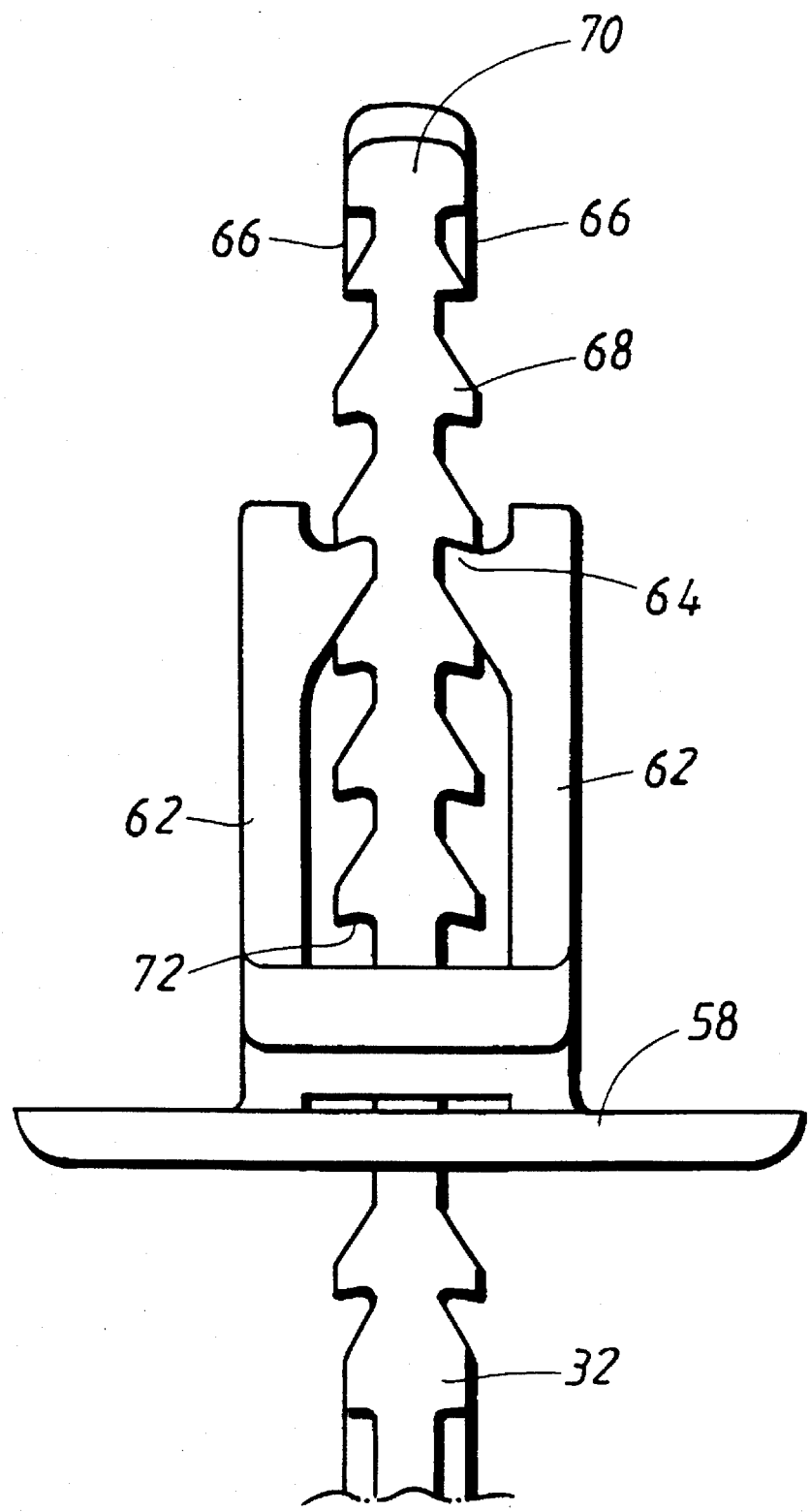
FIG. 9 is a plan view of an engagement member incorporated in the locking device according to the invention in engagement with the receiving arrangement of FIG. 8.

As is apparent from FIGS. 5, 7 and 9, the engagement member 32 may be in the form of an elongate flat rod having opposed notched surfaces 66 provided with at least one notch 68 on each surface. The engagement member is further provided with smooth side portions 70 between the opposed notched surfaces 66.

With reference to FIG. 9, the notches 68 on the engagement member 32 are so shaped that during insertion of the engagement member into the receiving arrangement, the jaws 62 of the receiving arrangement are resiliently displaced away from each other in a ratchet-like manner. In the inserted position of the engagement member 32 which corresponds to the raised position of the auxiliary seat 10 as shown in FIG. 2, each tooth 64 of the jaws 62 abuts a respective notch 68 on the engagement member. The notches are advantageously formed with an undercut 72 and the teeth are correspondingly shaped so that the tooth of each jaw may occupy substantially the entire space between adjacent notches. The undercut 72 ensures that the resilient jaws will not be forced apart if a large force is applied to the engagement member in a direction of removal of the engagement member opposite to the direction of insertion. In this manner, the engagement member is securely locked to the receiving arrangement 34.

In order to release the engagement member 32 from the receiving arrangement 34, for example when it is desired to return the auxiliary seat 10 to its stowed position, means are provided to disengage the teeth 64 of the jaws 62 from the notches 68 on the engagement member. These means include the engagement member being journalled to the spindle 38 for rotation along an axis transverse to the spindle between a normal position and a release position, as shown for example in FIG. 5. Rotation of the engagement member 32 is effected by operation in the direction of arrow A in FIG. 5 of a release lever 74 journalled to the main housing 36 and acting on a radially projecting spigot 76 on the engagement member. The release lever 74, and thereby also the engagement member, is biased by a return spring 78 to the normal position.

Activation of the release lever 74 causes the engagement member to rotate in the direction of arrow B to bring the smooth side portions 70 into contact with the teeth 64 on the jaws, thereby displacing the resilient jaws 62 of the receiving arrangement 34 away from each other. In this manner, the teeth 64 are released from engagement with the notches 68 of the engagement member. In this release position, the engagement member can be withdrawn from the receiving arrangement. Once withdrawn, the release lever 74 and the engagement member 32 will return to their normal position due to the influence of the return spring 78.

Figure 10:
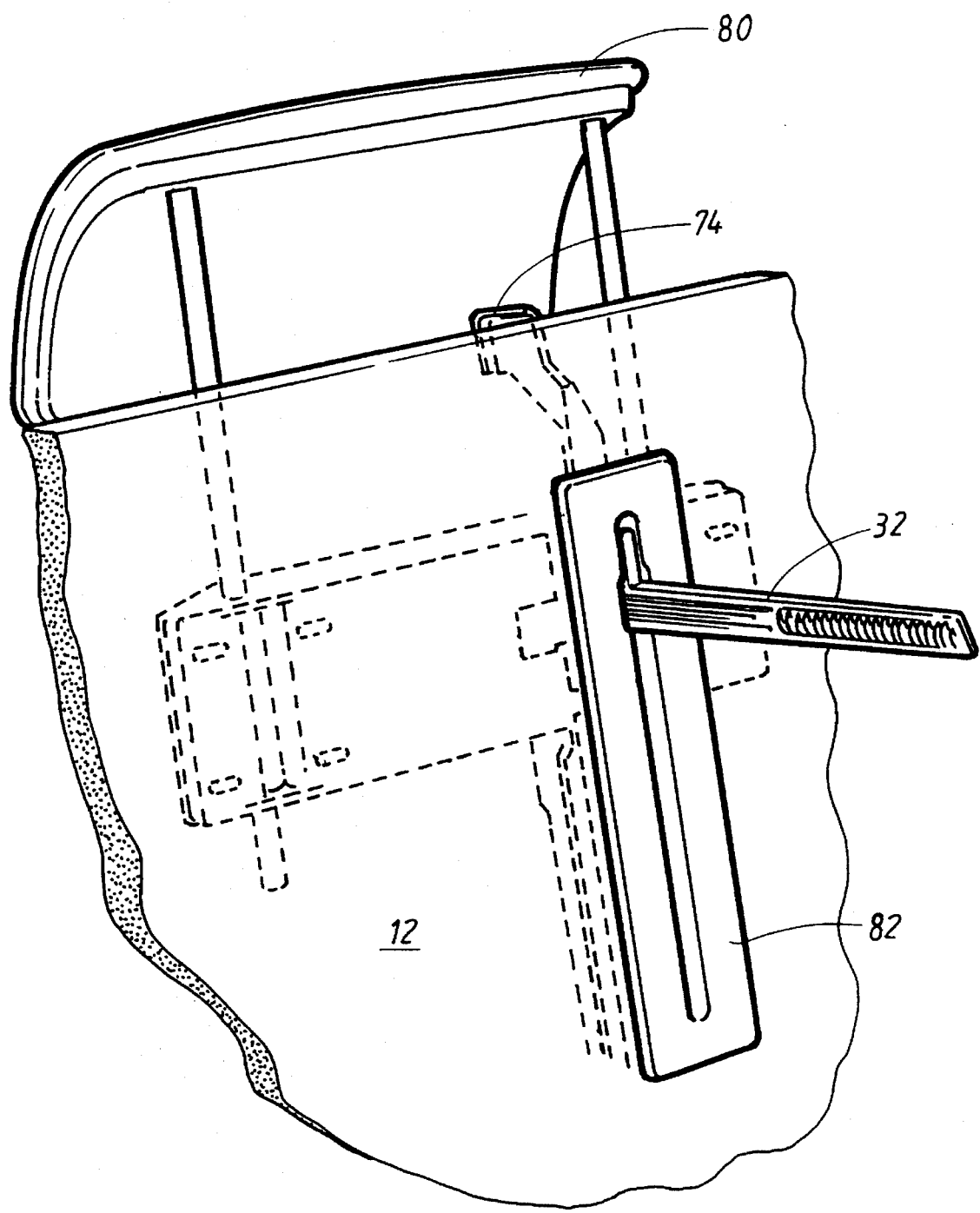
FIG. 10 is a schematic elevational view of the locking device in situ in the backrest of an auxiliary seat.

Finally, in FIG. 10 the locking device is shown in its mounted condition in the backrest of an auxiliary seat. Suitably, the locking device is secured to the backrest via an existing support mechanism for a head restraint 80. In this manner, the release lever 74 for the engagement member is easily accessible for operation, though at the same time is shielded by the head restraint to protect occupants from possible injury during a collision. As is apparent from FIG. 10, the locking device is provided with an external cover 82 presenting a slot 84 to allow the engagement member 32 to enter and exit the main housing of the locking device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For example, the locking device and receiving element may be used to secure together articles other than seats. In addition, the engagement member need not be in the form of a flat elongate rod as shown in the drawings, but may instead be round or poly-sided.

What is claimed is:

1. An automatic locking device suitable for a backrest of a rear-facing auxiliary seat, which backrest is pivotally displaceable between a stowed position in which the backrest is substantially coplanar with a cargo bay floor in a vehicle and a raised position in which an upper region of said backrest abuts a conventional rear seat backrest in said vehicle, said locking device comprising a main housing arranged in the backrest of said auxiliary seat;

an engagement member affixed to a spindle so as to be pivotally mounted in said main housing for displacement between a retracted position in which said member is substantially accommodated within said main housing and an extended position in which engagement member projects from said main housing in a direction towards said conventional rear seat backrest; and actuation means for effecting said displacement of said engagement member between said retracted position and said extended position;

wherein said actuation means effects said displacement of said engagement member responsive to the angular position of the backrest of the auxiliary seat with respect to the cargo bay floor.

2. The locking device as claimed in claim 1, wherein said actuation means comprises a spring arrangement cooperating with said spindle via a flexible operating strap.

3. The locking device as claimed in claim 2, wherein said spring arrangement is influenced by a command member, one end of said command member being affixed to the cargo bay floor.

4. The locking device as claimed in claim 3, wherein said command member is in the form of a flexible strap.

5. The locking device as claimed in claim 4, wherein said spring arrangement comprises a relatively weak spring and a relatively strong spring arranged side by side in a spring housing, with said command member being connected to said spring housing to effect sliding displacement of said spring housing within said main housing responsive to the angular position of the backrest of the auxiliary seat with respect to the cargo bay floor, and wherein said flexible operating strap presents a first free end, a second free end and a mid portion therebetween, said first free end cooperating with said relatively weak spring and said second free end cooperating with said relatively strong spring, with said operating strap passing around and being secured at its mid portion to the spindle of the engagement member.

6. The locking device as claimed in claim 1, wherein said engagement member is in the form of an elongate rod having opposed notched surfaces, said surfaces each being provided with at least one notch.

7. The locking device as claimed in claim 6, wherein said engagement member is journalled to said spindle for rotation between a normal position and a release position along an axis transverse to said spindle.

8. The locking device as claimed in claim 7, wherein said rotation between a normal position and a release position is effected by a release lever pivotally attached to said main housing.

9. The locking device as claimed in claim 1 or 8, wherein said engagement member cooperates with a receiving arrangement when said auxiliary seat backrest is in said raised position, said receiving arrangement being provided in said conventional rear seat backrest.

10. The locking device as claimed in claim 9, wherein said receiving arrangement comprises a pair of spaced apart, resilient jaws for engagement with said notches on said engagement member when said engagement member is in said normal position.

11. The locking device as claimed in claim 8, wherein said engagement member is provided with smooth side portions between said opposed major surfaces.

12. The locking device as claimed in claim 10 or 11, wherein said rotation of said engagement member to said release position causes said smooth side portions on said engagement member to displace the jaws of the receiving element away from each other to thereby disengage said jaws from the notches on the opposed notched surfaces of said engagement member.

13. A locking device comprising an engagement member journalled to a first component for rotation about an axis, and a receiving arrangement carried on a second component, said engagement member comprising an elongate rod extending along said axis and having opposed notched surfaces, said surfaces each being provided with at least one notch, and smooth side portions between said opposed notched surfaces;

and said receiving arrangement comprising a pair of spaced apart, resilient jaws for engagement with said notches on said engagement member when said engagement member is in a normal position; wherein when said engagement member is rotated from said normal position to a release position, said smooth side portions of said engagement member displace the jaws of the receiving element away from each other to thereby disengage said jaws from the notches on the opposed notched surfaces of said engagement member.

14. A locking device for operatively and automatically connecting a first component to a second component which first component is pivotally displaceable with respect to a fixed member between a first position and a second position, said locking device comprising:

a main housing arranged on said first component;

an engagement member affixed to a spindle so as to be pivotally mounted in said main housing for displacement between a retracted position in which said engagement member is substantially accommodated within said main housing and an extended position in which said engagement member projects from said main housing towards the second component; and actuation means for effecting displacement of said engagement member between said retracted position and said extended position wherein said actuation means effects displacement of said engagement member responsive to the angular position of the first component with respect to the fixed member.

15. The locking device as claimed in claim 14, wherein said first component is a backrest of an auxiliary seat, said fixed member is a cargo bay floor in a vehicle and said second component is a conventional vehicle rear seat backrest.

* * * * *